US010786855B2

(12) United States Patent
Ramfjord

(10) Patent No.: US 10,786,855 B2
(45) Date of Patent: Sep. 29, 2020

(54) SAWING SYSTEM, SAWING SUPPORT STRUCTURE AND A WIRE REPLACEMENT UNIT AND METHOD

(71) Applicant: 1 Diamond, LLC, Deer Park, TX (US)

(72) Inventor: Harald Ramfjord, Deer Park, TX (US)

(73) Assignee: 1 DIAMOND, LLC, Houston, TX (US)

(*) Notice: Subject to any disclaimer, the term of this patent is extended or adjusted under 35 U.S.C. 154(b) by 184 days.

(21) Appl. No.: 14/655,848

(22) PCT Filed: Dec. 27, 2013

(86) PCT No.: PCT/US2013/078047
§ 371 (c)(1),
(2) Date: Jun. 26, 2015

(87) PCT Pub. No.: WO2014/106081
PCT Pub. Date: Jul. 3, 2014

(65) Prior Publication Data
US 2015/0367430 A1  Dec. 24, 2015

(30) Foreign Application Priority Data
Dec. 28, 2012  (NO) .................................. 20121560

(51) Int. Cl.
*B23D 57/00* (2006.01)
*E02B 17/00* (2006.01)

(52) U.S. Cl.
CPC ..... *B23D 57/0007* (2013.01); *B23D 57/0038* (2013.01); *B23D 57/0084* (2013.01);
(Continued)

(58) Field of Classification Search
CPC ............ B23D 57/0084; B23D 57/0007; B23D 57/0023; B23D 57/003; B23D 57/0038;
(Continued)

(56) References Cited

U.S. PATENT DOCUMENTS 3,463,271 A      8/1969  St Louis
4,144,867 A  *  3/1979  Wachs .................. B28D 1/04
                                                             125/14

(Continued)

FOREIGN PATENT DOCUMENTS

CN    201128080 Y    10/2008
CN    101612683 A    12/2009
(Continued)

OTHER PUBLICATIONS

EPO, Rijks, Mark, Written Opinion of the International Searching Authority, pp. 1-5, dated Jun. 30, 2015, The Hague, Netherlands.
(Continued)

*Primary Examiner* — Evan H Macfarlane
(74) *Attorney, Agent, or Firm* — Oathout Law Firm; Mark A. Oathout; Laura Tu

(57) ABSTRACT

A leg cutting system with a leg support clamp 2 with a height for maintaining a structural integrity of the leg 1 during and after the leg 1 is cut. The system includes at least two leg support clamp parts joined in at least one clamp structure joint 11 with releasable mechanical fasteners for joining or releasing the at least two leg support clamp parts along the at least one clamp structure joint. A wire saw 6 with a wire saw support frame 7 and longitudinal saw tracks 16 for longitudinal displacement of the sawing wire along said longitudinal saw tracks 16 can be fixed to the leg support clamp. A wire replacement unit 9 with a plurality of sawing wires with a joint allowing the wires to be joined is located adjacent the wire saw. The embodiment(s) furthermore relates to a leg support clamp.

11 Claims, 6 Drawing Sheets

(52) U.S. Cl.
CPC .. *E02B 17/0034* (2013.01); *E02B 2017/0052* (2013.01); *Y10T 83/04* (2015.04); *Y10T 83/68* (2015.04)

(58) Field of Classification Search
CPC ............ B23D 57/0046; B23D 57/0061; B23D 57/0092; B23D 61/18; B23D 61/185; E02B 17/00; E02B 17/0034; E02B 2017/0052; E02B 2017/0056–0086; Y10T 83/667; Y10T 83/68; Y10T 83/7507; Y10T 83/9292; E02D 9/04; E21B 29/12
See application file for complete search history.

(56) References Cited

U.S. PATENT DOCUMENTS

| | | | | |
|---|---|---|---|---|
| H45 H | * | 4/1986 | Gilmore | 30/392 |
| 4,678,372 A | * | 7/1987 | Cousty | E02B 17/00 405/196 |
| 5,718,216 A | * | 2/1998 | Plattner | F16G 11/08 125/21 |
| 6,267,037 B1 | * | 7/2001 | McCoy, Jr. | B23D 57/0007 83/745 |
| 6,371,696 B1 | * | 4/2002 | Eathorne | B63B 59/10 405/211 |
| 8,286,625 B2 | * | 10/2012 | Jenkins | B23D 57/0007 125/12 |
| 8,833,358 B1 | * | 9/2014 | Robinson, III | B28D 1/08 125/16.02 |
| 2002/0112582 A1 | * | 8/2002 | Young | B23D 49/007 83/167 |
| 2004/0069103 A1 | * | 4/2004 | Matteucci | B23D 57/0038 83/13 |
| 2006/0115331 A1 | * | 6/2006 | Matteucci | B23D 57/0084 405/156 |
| 2006/0201302 A1 | * | 9/2006 | Schwaiger | B23D 45/068 83/477.2 |
| 2009/0266552 A1 | * | 10/2009 | Barra | E21B 19/002 166/339 |
| 2009/0314149 A1 | * | 12/2009 | Clark, II | B23D 57/0007 83/651.1 |
| 2010/0186564 A1 | * | 7/2010 | Pierce | B23D 57/0007 83/72 |
| 2010/0212164 A1 | * | 8/2010 | Garavaglia | B26B 5/001 30/162 |
| 2011/0150623 A1 | | 6/2011 | Thomas et al. | |
| 2011/0208358 A1 | * | 8/2011 | Gjelsten | B25J 19/023 700/259 |
| 2011/0214543 A1 | * | 9/2011 | Shae | B23D 57/0007 83/54 |
| 2011/0290501 A1 | * | 12/2011 | Duncan | E21B 21/106 166/363 |
| 2012/0117959 A1 | * | 5/2012 | Lewkoski | B23D 57/0084 60/431 |
| 2012/0174723 A1 | * | 7/2012 | Matteucci | B23D 57/0007 83/794 |
| 2012/0189390 A1 | | 7/2012 | Belinsky et al. | |

FOREIGN PATENT DOCUMENTS

| | | |
|---|---|---|
| CN | 102229009 A | 11/2011 |
| EP | 0540834 B2 | 5/2004 |
| JP | H10258423 A | 9/1998 |
| JP | 2001162617 A * | 6/2001 |
| WO | 86/06121 A1 | 10/1986 |
| WO | 88/02718 A1 | 4/1988 |
| WO | 99/10232 A1 | 3/1999 |
| WO | 99/43921 A1 | 9/1999 |
| WO | 00/78491 A1 | 12/2000 |
| WO | 2009084953 | 7/2009 |
| WO | 2011062504 | 5/2011 |
| WO | 2014092568 | 6/2014 |

OTHER PUBLICATIONS

UK IPO, Parker, Megan, Examination Report under Section 18(3), pp. 1-3, dated Oct. 3, 2016, Newport, South Wales.
O'Connell, Wayne, Examination report No. 1 for standard patent application, dated Mar. 27, 2017, 4 pages, IP Australia, Australia.
Rode, Henrik M., Norwegian Search Report for Patent Application No. 20141423, dated Apr. 21, 2015, 2 pages, Norwegian Industrial Property Office, Norway.
Jose Enrique Cazares Avila, Ref: Su solicitud No. MX/a/2015/008411 de Patente PCT presentada el 27 de diciembre de 2013, May 25, 2018, 5 pages, IMPI, Mexico.
Prakash Rudani, Examination Report under sections 12 & 13 of the Patents Act, 1970 and the Patents Rules, 2003, Mar. 12, 2019, 6 pages, Intellectual Property India, Mumbai, India.

* cited by examiner

SAWING SYSTEM, SAWING SUPPORT STRUCTURE AND A WIRE REPLACEMENT UNIT AND METHOD

TECHNICAL FIELD

The technical field relates to sawing systems, sawing support structures and wire replacement units for cutting tubular structures, and in particular cutting legs supporting large structures such as platform legs or jacket legs supporting offshore platforms.

BACKGROUND

When cutting tubular structures, and in particular when cutting legs supporting large structures such as platform legs or jacket legs supporting offshore platforms, it is important to maintain the integrity of the leg until the structure the leg is supporting is ready for removal. Several legs must typically be cut before the structure can be removed, and it is important to be able to perform all the cutting while maintaining the integrity of each leg before allowing all the legs to be released simultaneously. It is also essential to be able to perform the cutting even when the structure to be cut is exposed to considerable compressive loads. Furthermore it is important to be able to abort the cutting while maintaining the integrity of the leg that is cut typically to allow for altered weather conditions, mechanical failures etc.

SUMMARY

In the further specification, the term "leg" is particularly meant to refer to a platform leg of an offshore platform, but the embodiment(s) may clearly be utilized for other structures that need to be cut while the integrity is maintained. Such structures may include factory chimneys and other similar structures, but the embodiment(s) are particularly adapted for subsea cutting. The term leg is intended to encompass such large longitudinal structures.

Accordingly, the present disclosed embodiment(s) relate to a leg cutting system with a leg support clamp with a height h for maintaining a structural integrity of the leg during and after the leg is cut. The system includes at least two leg support clamp parts allowing the leg support clamp to be installed around the leg. The at least two leg support clamp parts are joined in at least one clamp structure joint with releasable mechanical fasteners for joining or releasing the at least two leg support clamp parts along the at least one clamp structure joint. The mechanical fasteners may include bolts that may be released by explosive charges or may include mechanical/hydraulic actuators or locking mechanisms to join the at least two leg support clamp parts.

The leg cutting system may further include a plurality of leg grippers with actuators to provide a clamping force between the leg support clamp and the leg. The actuators are typically hydraulic actuators, and the grippers may include a mechanical locking system for locking the grippers after they have been set against the leg.

A plurality of longitudinal clamp stiffeners extend in a longitudinal direction substantially parallel to the leg along the height h to maintain the longitudinal stiffness of the clamp while allowing a wire saw to cut through the leg. A wire saw attachment structure is fixed to the leg support clamp along the height h to allow the clamp to support the structure at both sides of the leg after the leg is cut. A wire saw with a wire saw support frame and longitudinal saw tracks for longitudinal displacement of the sawing wire along the longitudinal saw tracks is secured to the wire saw attachment structure. A wire replacement unit with a plurality of sawing wires with a joint allowing the wires to be joined is located adjacent at least one of the plurality of longitudinal clamp stiffeners. The wires are thus allowed to be joined after they have been located around the at least one of the plurality of longitudinal clamp stiffeners.

The wire saw attachment structure may be fixed to the leg support clamp and may include a wire saw docking structure for allowing the wire saw to be installed in the docking structure with a remotely operated vehicle (or "ROV") after the leg support clamp is fixed to a leg in a submerged position. The leg support clamp both serves to maintain the integrity of the leg and to provide a suitable attachment or base for the wire saw.

The wire replacement unit with a plurality of sawing wires with a joint allowing the wires to be joined, is located adjacent the longitudinal clamp stiffeners and the wire joint is adapted to be joined with a ROV after the wire is led around at least one of the plurality of longitudinal clamp stiffeners to prevent the wire from cutting through the leg support clamp.

Furthermore the embodiment(s) relate to a leg support clamp with a height h for maintaining the structural integrity of the leg during and after the leg is cut. The system includes at least two leg support clamp parts allowing the leg support clamp to be installed around the leg. The at least two leg support clamp parts are joined in at least one clamp structure joint with releasable mechanical fasteners for joining or releasing the at least two leg support clamp parts along the at least one clamp structure joint. The mechanical fasteners may include bolts that may be released by explosive charges or may include mechanical/hydraulic actuators or locking mechanisms to join the at least two leg support clamp parts.

A plurality of leg grippers includes actuators to provide a clamping force between the leg support clamp and the leg. The actuators are typically hydraulic actuators, and the grippers may include a mechanical locking system for locking the grippers after they have been set against the leg.

A plurality of longitudinal clamp stiffeners extend in a longitudinal direction substantially parallel to the leg along the height h maintain the longitudinal stiffness of the clamp. A wire saw attachment structure is fixed to the leg support clamp along the height h to allow the clamp to support the structure at both sides of the leg after the leg is cut.

The present embodiment(s) further include a method of cutting a leg supporting a structure comprising providing a structural integrity maintaining leg support clamp with a plurality of longitudinal clamp stiffeners for extending in a longitudinal direction substantially parallel to the leg and a sawing wire opening along a height h formed by at least two leg support clamp parts. The method further includes locating the at least two leg support clamp parts around the leg supporting a structure, joining said at least two leg support clamp parts in at least one clamp structure joint with releasable mechanical fasteners, providing a wire saw with a sawing wire, a wire saw support frame and longitudinal sawing wire saw tracks on said leg support clamp along the height h, sawing through the leg with said wire saw while guiding the sawing wire along the sawing wire saw tracks and while the structural integrity maintaining leg support clamp maintains the structural integrity of the leg; and releasing the releasable mechanical fasteners when the structural integrity of the leg no longer is needed.

The structural integrity maintaining leg support clamp may further include a wire saw docking structure, and the wire saw may be formed as a separate wire saw module. The method further includes the steps of docking the wire saw module in the wire saw docking structure, threading said sawing wire through a sawing wire opening, joining ends of said sawing wire in a sawing wire joint, whereby said sawing wire forms a sawing wire loop around at least one of said plurality of longitudinal clamp stiffeners before cutting said leg with said wire saw, opening said sawing wire joint after said leg is cut, and removing said wire saw module from said wire saw docking structure.

The wire saw module may further include a sawing wire replacement unit with replacement sawing wires and the method may then further include exchanging a broken sawing wire with a replacement sawing wire upon failure of a sawing wire.

The exchange of a broken sawing wire may be performed subsea with a ROV.

DESCRIPTION OF EMBODIMENTS

The description that follows includes exemplary apparatus, methods, and techniques that embody techniques of the inventive subject matter. However, it is understood that the described embodiments may be practiced without these specific details.

Figure 1:
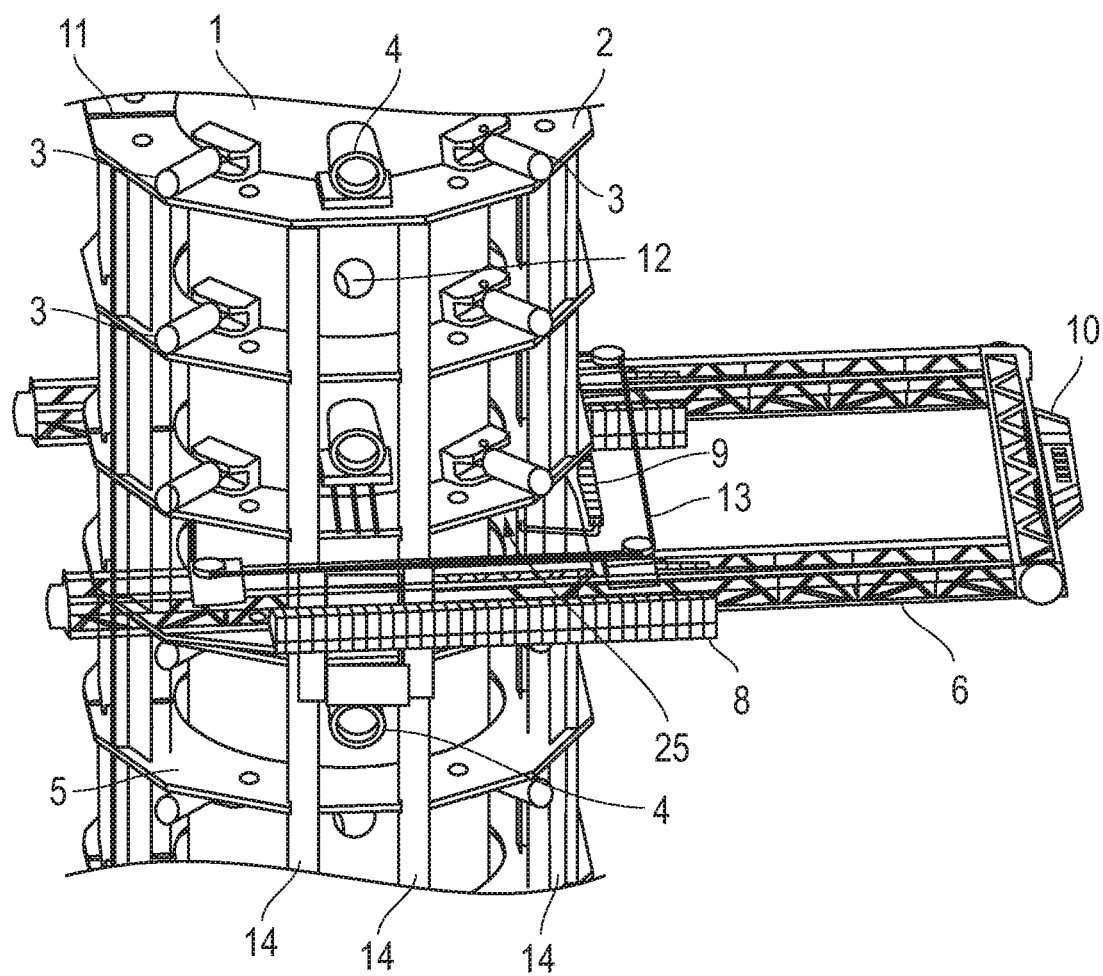
FIG. 1 is a perspective view of a leg support clamp with a wiresaw according to one embodiment.

FIG. 1 shows a subsea leg sawing system embodiment with a structural integrity maintaining leg support clamp, in the following just leg support clamp 2 clamped to a leg 1 of platform 27 (illustration of platform 27 in FIG. 2). Two leg support clamp parts 23 and 24 are joined in a clamp structure joint 11 to allow the leg support clamp 2 to be installed around the leg 1. The leg support clamp 2 defines a circular opening 41 between the leg support clamp parts 23 and 24, through which the leg 1 is installed. The leg 1 includes platform leg locating holes 12, and locating pegs or stab bolts 4 attached to stiffening plates 5 on the leg support clamp 2 are provided to extend into the locating holes to provide a rigid attachment between the platform leg 1 and the leg support clamp. The locating pegs or stab bolts 4 may be moved in a longitudinal direction with suitable linear actuators. Longitudinal clamp stiffeners 14 extend in a longitudinal direction substantially parallel to the leg 1 and are supported by the stiffening plates 5. A wire saw docking structure 8 is attached substantially midway along the longitudinal clamp stiffeners 14 to allow a wire saw 6 to be led into the docking system with ROVs after installation of the leg support clamp 2 onto the leg 1. The wire saw 6 is formed as a separate wire saw module 26 and includes control elements 10 for controlling the operation of the wire saw 6 and a sawing wire loop 13. A wire replacement unit 9 is located adjacent the saw docking structure 8 and includes redundant replacement wires for the wire saw. The sawing wire 13 runs in a loop around one of the longitudinal stiffeners 14 to prevent the wire from sawing into the leg support clamp. A plurality of leg grippers 3 include actuators to provide a clamping force between the leg support clamp 2 and the leg 1. The actuators are typically hydraulic or electromechanical actuators, and the grippers may include a mechanical locking system for locking the grippers after they have been set against the leg. The plurality of leg grippers 3 are attached to the stiffening plates 5 to hold the leg support clamp 2 to the platform leg at both sides of where the cut is made. A sawing wire opening 25 is formed between the leg 1 and at least one longitudinal clamp stiffener 14.

Figure 2:
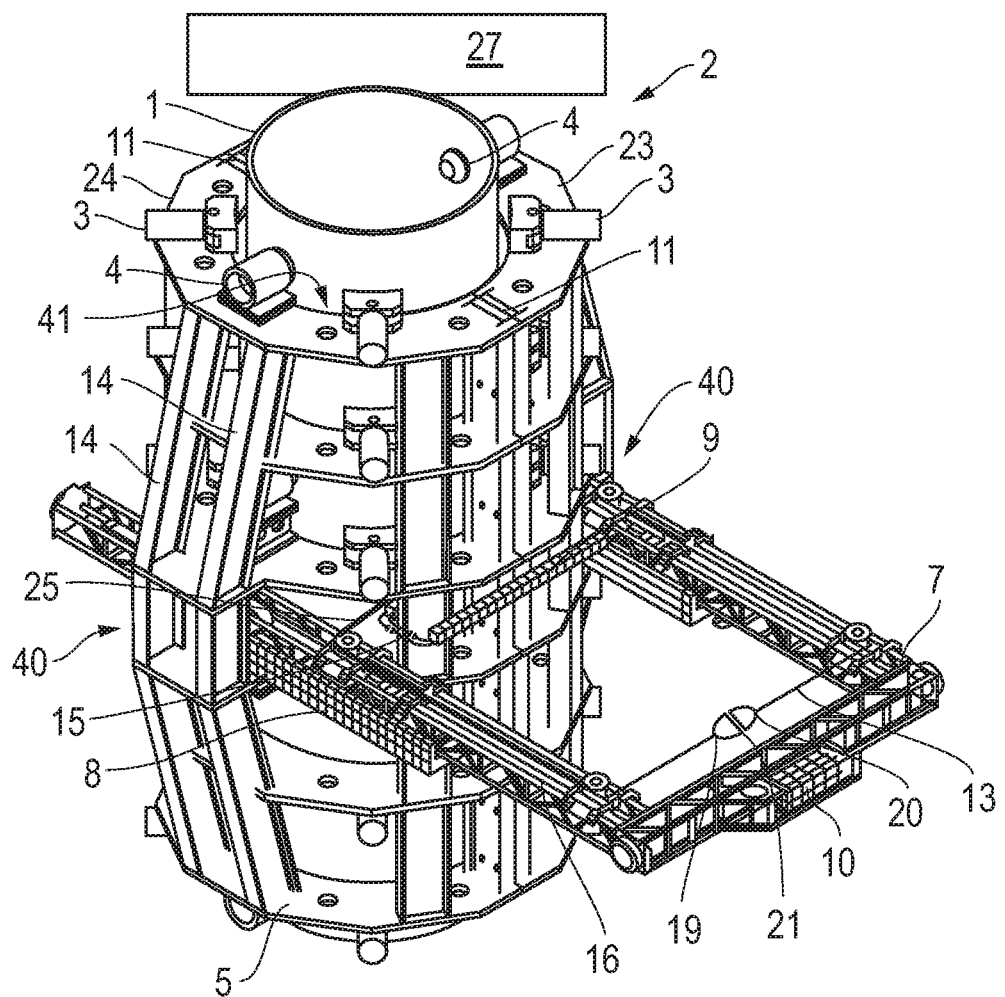
FIG. 2 corresponds to FIG. 1, but shows the invention in greater detail.

FIG. 2 corresponds to FIG. 1, and shows the various elements in further detail. The wire replacement unit with the redundant replacement sawing wires 15 is shown adjacent the wire saw with longitudinal saw tracks 16 for leading the sawing wire 13 through the leg 1 of platform 27. The leg cutting system includes a wire replacement unit 9 with a plurality of replacement sawing wires 15 each with a joint allowing the wires 15 to be joined. Ends 19, 20 of the sawing wire 13 are joined in a sawing wire joint 21, and the wire forms a sawing wire loop around at least one of the plurality of longitudinal clamp stiffeners 14. Releasable mechanical fasteners joins or releases the two leg support clamp parts 23, 24 along the at least one clamp structure joint 11. The sawing wire 13 runs through the sawing wire opening between the leg 1 and at least one longitudinal clamp stiffener 14. The two leg support clamps 23 and 24 may be bowed our or include a bow 40 in the middle of each of the leg support clamp parts 23, 24 along the height h of the leg support clamp 2.

Figure 3:
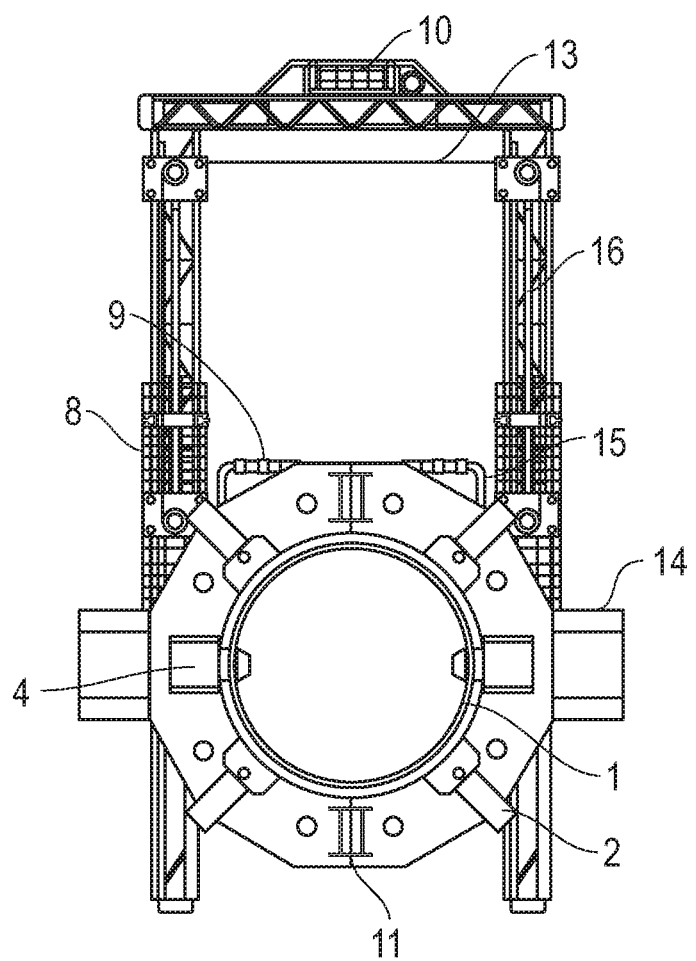
FIG. 3 is a top view of the embodiment shown in FIGS. 1 and 2.
Figure 3A:
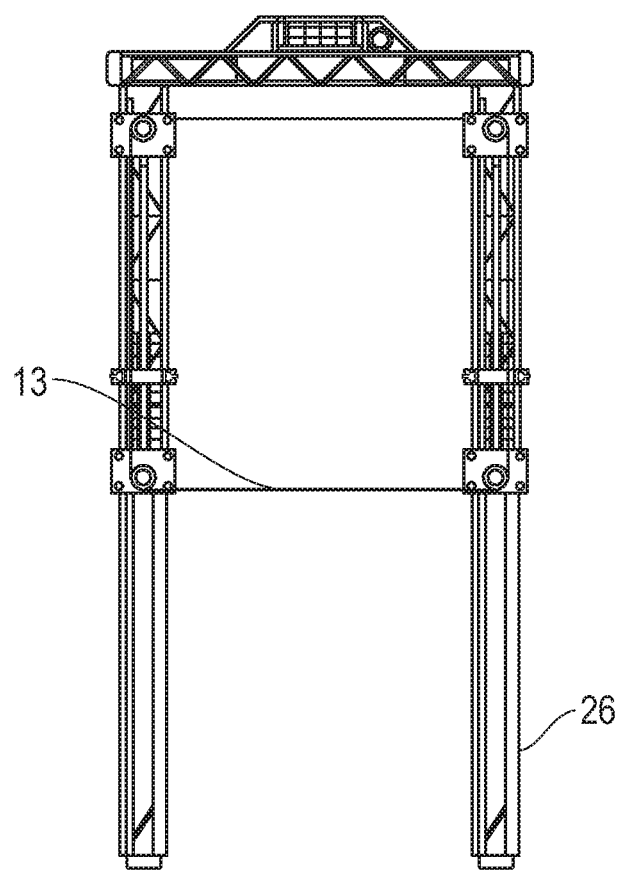
FIG. 3a is a top view of wire saw module shown in FIG. 3.
Figure 3B:
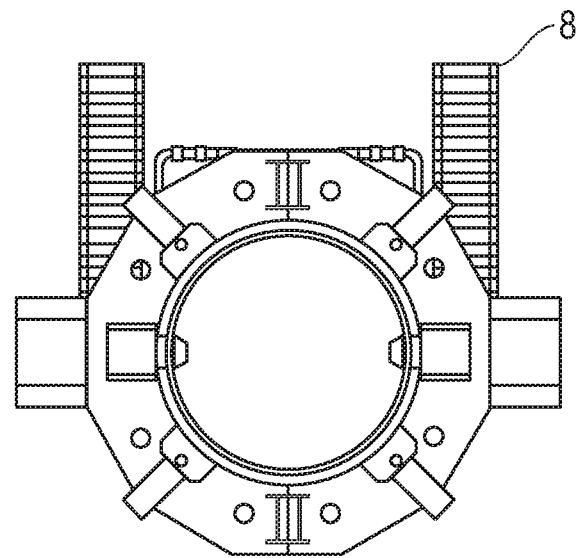
FIG. 3b is a top view of a structural integrity maintaining leg support clamp shown in FIG. 3.

FIG. 3 corresponds to FIGS. 1 and 2 and is a top view more clearly showing the clamp structure joint 11 and two leg support clamp halves.

Figure 4:
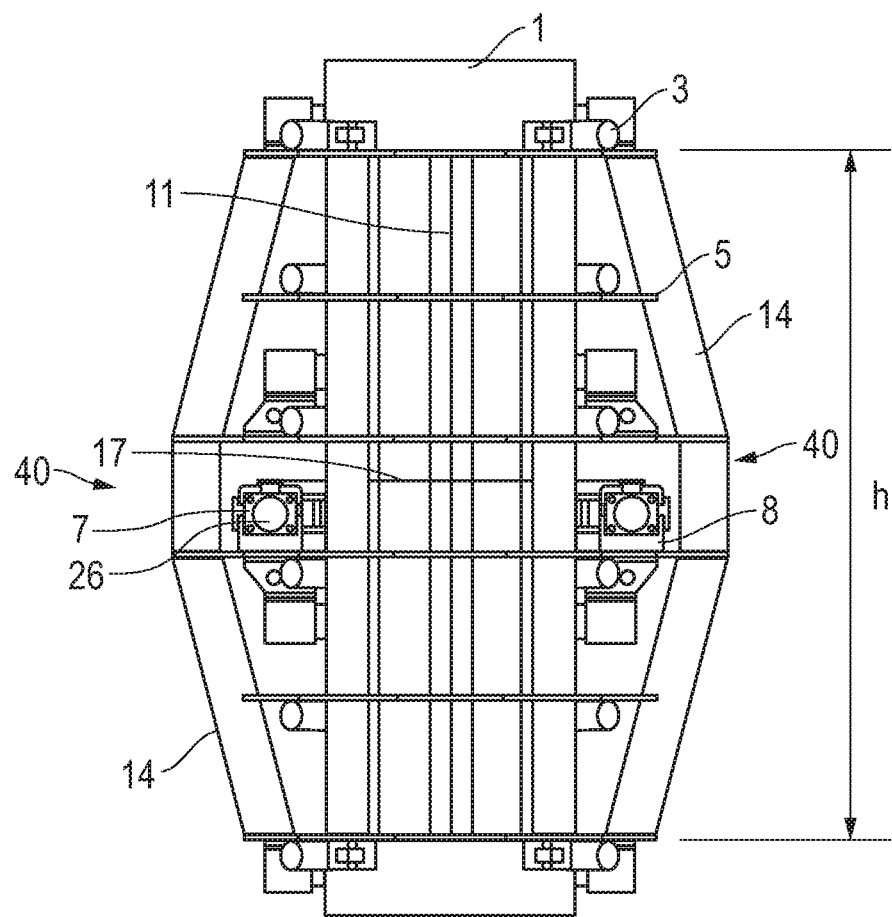
FIG. 4 is a side elevation of the embodiment shown in FIGS. 1, 2 and 3.

FIG. 4 corresponds to FIGS. 1, 2 and 3 and is a side elevation of that embodiment, where the wire saw support frame 7 and the docking station 8 is shown, omitting some parts of the wire saw support frame to better show the leg support clamp and the clamp structure joint 11. FIG. 4 goes on to show a cut line 11 where the platform leg 1 is cut. The cut line 17 also represents an opening in at least one of the two halves constituting a sawing wire opening along a height h joined in the clamp structure joint 11. The sawing wire opening along the height h ensures that the sawing wire can cut through the leg without cutting the leg support clamp. The longitudinal clamp stiffeners 14 maintain the structural integrity of the clamp in spite of the sawing wire opening in the center of the leg support clamp.

The cutting line 17 is shown perpendicular to a longitudinal axis of the leg 1, but the saw may be somewhat inclined in relation to the longitudinal axis of the leg if an inclined cut is to be performed.

The clamp structure joint 11 is parallel to the longitudinal axis of the leg, and this is particularly favorable when the leg support clamp is formed by two leg support clamp halves. The leg support clamp could however have been made with for instance three leg support parts, and the clamp joints may then not necessarily be parallel to the leg axis.

The wire saw docking structure 8 and the wire saw support frame 7 ensures that the wire saw may be built as a separate wire saw module that may be removed from the leg support clamp and may be reused on a different leg support clamp, supporting a different leg. In this way the same wire saw module may be used to cut all the legs of for instance an offshore platform while a plurality of leg support clamps maintains the integrity of the plurality of legs until all the support clamps are released simultaneously.

The leg support clamp of the figures is shown with parallel sides, and for cutting cylindrical legs. The leg support clamp of the embodiment(s) may clearly be adapted for legs of different shape, for instance tapered legs, and the leg support clamp may then include a conical interior surface adapted to conform to the tapered surface of the leg. The hydraulic grippers 3 may also allow some leeway for cutting legs of varying dimensions or shape.

The various embodiments may include both a version with a wire saw fixed to/integrated with the leg support clamp, and a preferred version where the wire saw is a separate module that may be installed or removed independently of the leg support clamp.

Figure 5:
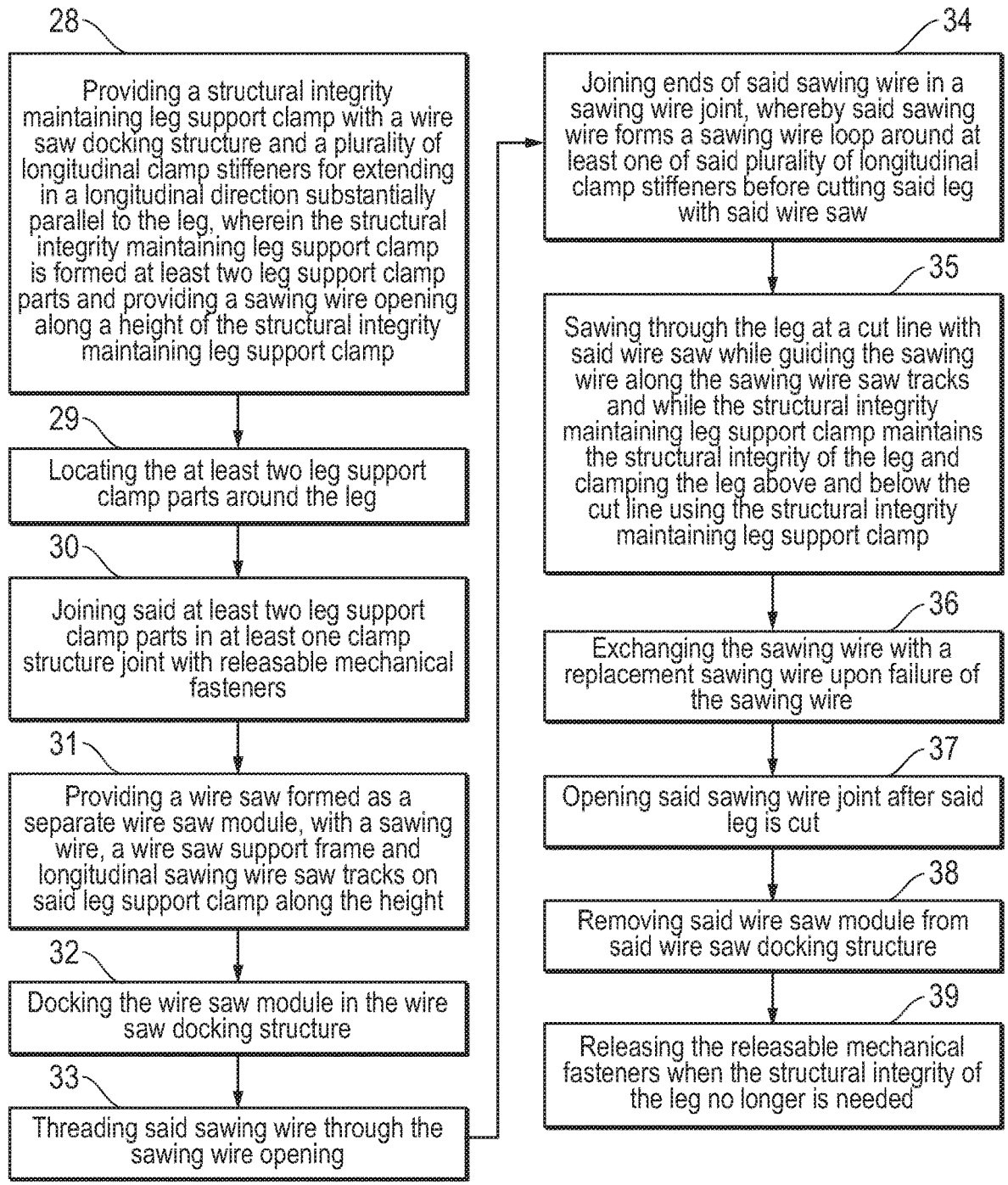
FIG. 5 is a method flow chart of one exemplary embodiment of the invention.

FIG. 5 shows a method flow chart of one exemplary embodiment of the invention for cutting a leg. Block 28 shows the step of providing a structural integrity maintaining leg support clamp with a wire saw docking structure and a plurality of longitudinal clamp stiffeners for extending in a longitudinal direction substantially parallel to the leg, wherein the structural integrity maintaining leg support clamp is formed by at least two leg support clamp parts and the step of providing a sawing wire opening along a height of the structural integrity maintaining leg support clamp. Block 29 shows the step of locating the at least two leg support clamp parts around the leg. Block 30 shows the step of joining said at least two leg support clamp parts in at least one clamp structure joint with releasable mechanical fasteners. Block 31 shows the step of providing a wire saw formed as a separate wire saw module, with a sawing wire, a wire saw support frame and longitudinal sawing wire saw tracks on said leg support clamp along the height. Block 32 depicts the step of docking the wire saw module in the wire saw docking structure. Block 33 shows the step of threading said sawing wire through the sawing wire opening. Block 34 shows the step of joining ends of said sawing wire in a sawing wire joint, whereby said sawing wire forms a sawing wire loop around at least one of said plurality of longitudinal clamp stiffeners before cutting said leg with said wire saw. Block 35 shows the step of sawing through the leg at a cut line with said wire saw while guiding the sawing wire along the sawing wire saw tracks and while the structural integrity maintaining leg support clamp maintains the structural integrity of the leg and the step of clamping the leg above and below the cut line using the structural integrity maintaining leg support clamp. Block 36 shows the step of exchanging the sawing wire with a replacement sawing wire upon failure of the sawing wire. Block 37 shows the step of opening said sawing wire joint after said leg is cut. Block 38 shows the step of removing said wire saw module from said wire saw docking structure. Block 39 shows the step of releasing the releasable mechanical fasteners when the structural integrity of the leg no longer is needed.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. Applicant hereby incorporates by reference the related Norwegian Patent Application no. 20121560, filed Dec. 28, 2012.

| | |
|---|---|
| 1 | Platform leg |
| 2 | Structural integrity maintaining leg support clamp |
| 3 | Hydraulic grippers |
| 4 | Locating pegs |
| 5 | Stiffening plates |
| 6 | Wire saw |
| 7 | Wire saw support frame |
| 8 | Wire saw docking structure |
| 9 | Wire replacement unit |
| 10 | Control elements |
| 11 | Clamp structure joint |
| 12 | Platform leg locating hole |
| 13 | Sawing wire loop |
| 14 | Longitudinal clamp stiffeners |
| 15 | Replacement Sawing wires |
| 16 | Longitudinal saw track |
| 17 | Cut line |

The invention claimed is:

1. A leg cutting system comprising
a structural integrity maintaining leg support clamp with a height, the leg support clamp maintaining the structural integrity of a leg during and after the leg is cut, wherein the leg support clamp defines a bow towards a middle of the height, and further wherein the leg support clamp comprises:
at least a first leg support clamp part and a second leg support clamp part allowing the leg support clamp to be installed around the leg, wherein the at least first and second leg support clamp parts are joined in a first clamp structure joint and wherein the at least first leg support clamp part and the second leg support clamp part are joined in a second clamp structure joint diametrically opposed to the first clamp structure joint;
a circular opening defined between the first leg support clamp part and the second leg support clamp part; and
a plurality of longitudinal clamp stiffeners for extending in a longitudinal direction of the leg along the height, maintaining a structural integrity of the leg support clamp in spite of a sawing wire opening in the leg support clamp;
a wire saw attachment structure fixed to the leg support clamp along the height; and
a wire saw assembly with a wire saw support frame and longitudinal saw tracks for longitudinal displacement of a sawing wire along said longitudinal saw tracks, whereby the leg support clamp supports the leg at both sides of a cut line after the leg is cut, and whereby the leg support clamp clamps the leg at both sides of the cut line after the leg is cut.

2. The leg cutting system of claim 1, further including a plurality of leg grippers including leg gripper actuators located on the leg support clamp to provide a clamping force between the leg support clamp and the leg.

3. The leg cutting system of claim 1 further including a wire replacement unit with a replacement sawing wire.

4. The leg cutting system of claim 3 wherein the wire replacement unit with the replacement sawing wire is located adjacent the longitudinal clamp stiffeners and the wire is led around at least one of the plurality of longitudinal clamp stiffeners.

5. The leg cutting system of claim 1, wherein the first and second clamp structure joints are parallel to the longitudinal direction of the leg, and further wherein the first and second leg support clamp parts comprise a first and second clamp halve, respectively.

6. A leg support clamp system comprising
a leg support clamp with a height, the leg support clamp for maintaining a structural integrity of a leg during and after the leg is cut at a cut line,
   wherein the leg support clamp is bowed out towards a middle of the height, and further wherein the leg support clamp comprises:
      at least two leg support clamp parts defining a circular opening allowing the leg support clamp to be installed around the leg, wherein the at least two leg support clamp parts are joined in a first clamp structure joint and a second clamp structure joint, wherein the second clamp structure joint is diametrically opposed to the first clamp structure joint, wherein the leg support clamp clamps above and below the cut line;
      a plurality of leg grippers including actuators located on the leg support clamp to provide a clamping force between the leg support clamp and the leg; and
      longitudinal clamp stiffeners for extending in a longitudinal direction to the leg along the height; and
a wire saw attachment structure fixed to the leg support clamp along the height.

7. The leg cutting system of claim 6, wherein the first and second clamp structure joints are parallel to the longitudinal direction of the leg, and further wherein the at least two leg support clamp parts comprise a first and second clamp halve.

8. A method of cutting a leg comprising:
providing a structural integrity maintaining leg support clamp with a plurality of longitudinal clamp stiffeners for extending in a longitudinal direction to the leg, wherein the structural integrity maintaining leg support clamp is bowed out near a middle of a height of the structural integrity maintaining leg support clamp, and further wherein the structural integrity maintaining leg support clamp is formed by at least two leg support clamp parts having a circular opening between the at least two leg support clamp parts;
providing a sawing wire opening along the height of the structural integrity maintaining leg support clamp;
locating the at least two leg support clamp parts around the leg;
joining said at least two leg support clamp parts in a first clamp structure joint;
joining said at least two leg support clamp parts in a second clamp structure joint, wherein the second clamp structure joint is diametrically opposed to the first clamp structure joint;
providing a wire saw assembly with a sawing wire, a wire saw support frame and longitudinal sawing wire saw tracks on said leg support clamp along the height;
sawing through the leg at a cut line with said wire saw assembly while guiding the sawing wire along the sawing wire saw tracks and while the structural integrity maintaining leg support clamp maintains the structural integrity of the leg; and
clamping the leg above and below the cut line using the structural integrity maintaining leg support clamp.

9. The method according to claim 8 wherein the structural integrity maintaining leg support clamp further includes a wire saw docking structure, and the wire saw assembly is formed as a separate wire saw module, said method further including the steps of:
docking the wire saw module in the wire saw docking structure;
threading said sawing wire through the sawing wire opening;
joining ends of said sawing wire, whereby said sawing wire forms a sawing wire loop around at least one of said plurality of longitudinal clamp stiffeners before cutting said leg with said wire saw assembly;
opening said sawing wire loop after said leg is cut; and
removing said wire saw module from said wire saw docking structure.

10. The method according to claim 9, wherein the wire saw module further includes a sawing wire replacement unit with a replacement sawing wire, the method further including exchanging the sawing wire with the replacement sawing wire upon failure of the sawing wire.

11. The method of claim 8, wherein the first and second clamp structure joints are parallel to the longitudinal direction of the leg, and further wherein the at least two leg support clamp parts comprise a first and second clamp halve.

* * * * *